(12) United States Patent
Burtt

(10) Patent No.: US 9,103,563 B1
(45) Date of Patent: Aug. 11, 2015

(54) INTEGRATED THERMAL MODULE AND BACK PLATE STRUCTURE AND RELATED METHODS

(75) Inventor: Eric R. Burtt, Orinda, CA (US)

(73) Assignee: SunEdison, Inc., Maryland Heights, MO (US)

( * ) Notice: Subject to any disclaimer, the term of this patent is extended or adjusted under 35 U.S.C. 154(b) by 0 days.

(21) Appl. No.: 12/851,310

(22) Filed: Aug. 5, 2010

Related U.S. Application Data

(63) Continuation of application No. 12/638,964, filed on Dec. 15, 2009, now abandoned.

(60) Provisional application No. 61/141,623, filed on Dec. 30, 2008.

(51) Int. Cl.
*E04D 13/18* (2014.01)
*F24J 2/04* (2006.01)

(52) U.S. Cl.
CPC ...................................... *F24J 2/045* (2013.01)

(58) Field of Classification Search
CPC ........ Y02B 10/20; Y02B 10/22; Y02E 10/40; Y02E 10/44; Y02E 10/47; H02S 20/23; F24J 2/045; F24J 2/0455
USPC .................. 52/173.3, 198, 199, 302.1, 302.3; 454/900; 126/621, 623, 628
See application file for complete search history.

(56) References Cited

U.S. PATENT DOCUMENTS 842,658 A * 1/1907 Haskell .......................... 126/640
2,944,371 A 7/1960 Muhr
3,841,302 A 10/1974 Falbel
3,957,109 A 5/1976 Worthington
4,062,351 A 12/1977 Hastwell
(Continued)

FOREIGN PATENT DOCUMENTS

DE 3611542 A1 10/1987
JP 63006343 A 12/1998
(Continued)

OTHER PUBLICATIONS

Office Action and List of References for U.S. Appl. No. 13/250,908 dated Jul. 5, 2012.
(Continued)

*Primary Examiner* — Brian Glessner
*Assistant Examiner* — Adam Barlow
(74) *Attorney, Agent, or Firm* — Armstrong Teasdale LLP

(57) ABSTRACT

A thermal solar system having a fire rating of at least A. In a specific embodiment, the system includes a thermal solar module having an aperture region and a backside region. The system has a shaped thickness of material having a first side and a second side. In a preferred embodiment, the shaped thickness of material is characterized by a fire rating of at least A. The material has a thickness suitable to be free from penetration of moisture according to one or more embodiments. The thickness of material also has a structural characteristic capable of maintaining a shape and coupling to the backside region of the thermal solar module according to one or more embodiments. The system also has an air plenum provided between the thermal solar module and the thickness shaped thickness of material. In a preferred embodiment, the system further has a frame assembly operably coupled to the shaped thickness of material to support the shaped thickness of material and the thermal solar module.

31 Claims, 18 Drawing Sheets

(56) References Cited

U.S. PATENT DOCUMENTS

| | | | |
|---|---|---|---|
| 4,068,652 A * | 1/1978 | Worthington | 126/603 |
| 4,082,080 A | 4/1978 | Pittinger | |
| 4,103,493 A * | 8/1978 | Schoenfelder | 60/641.11 |
| 4,128,124 A * | 12/1978 | Worthington | 165/48.2 |
| 4,141,339 A * | 2/1979 | Weinstein | 126/621 |
| 4,172,442 A * | 10/1979 | Boblitz | 126/591 |
| 4,228,729 A | 10/1980 | Messick | |
| 4,242,872 A * | 1/1981 | Shaw | 62/235.1 |
| 4,275,709 A | 6/1981 | Barcelo Rubi | |
| 4,338,991 A | 7/1982 | Sigworth, Jr. | |
| 4,393,859 A | 7/1983 | Marossy et al. | |
| 4,426,999 A * | 1/1984 | Evans et al. | 126/669 |
| 4,437,511 A | 3/1984 | Sheridan | |
| 4,538,592 A * | 9/1985 | Sundquist | 126/706 |
| 4,552,205 A | 11/1985 | Saunders | |
| 4,765,308 A | 8/1988 | Marran | |
| 4,967,729 A | 11/1990 | Okumura | |
| 5,452,710 A * | 9/1995 | Palmer | 126/572 |
| 5,547,017 A | 8/1996 | Rudd | |
| 5,589,006 A | 12/1996 | Itoyama et al. | |
| 5,768,831 A * | 6/1998 | Melchior | 52/173.3 |
| 5,849,107 A | 12/1998 | Itoyama et al. | |
| 5,851,309 A | 12/1998 | Kousa | |
| 5,881,806 A | 3/1999 | Rudd | |
| 5,908,674 A | 6/1999 | Schindler et al. | |
| 6,061,978 A | 5/2000 | Dinwoodie et al. | |
| 6,063,996 A | 5/2000 | Takada et al. | |
| 6,093,884 A * | 7/2000 | Toyomura et al. | 136/244 |
| 6,182,403 B1 | 2/2001 | Mimura et al. | |
| 6,182,404 B1 * | 2/2001 | Rinklake et al. | 52/173.3 |
| 6,431,268 B1 | 8/2002 | Rudd | |
| 6,472,593 B1 | 10/2002 | Middelman et al. | |
| 6,792,938 B2 | 9/2004 | Komano et al. | |
| 6,800,801 B2 * | 10/2004 | Sasaoka et al. | 136/246 |
| 6,916,239 B2 | 7/2005 | Siddaramanna et al. | |
| 7,044,397 B2 | 5/2006 | Bartlett et al. | |
| 7,206,728 B2 | 4/2007 | Ozeki et al. | |
| 7,297,866 B2 | 11/2007 | Aschenbrenner | |
| 7,475,828 B2 | 1/2009 | Bartlett et al. | |
| 7,484,507 B2 | 2/2009 | Nikiforov et al. | |
| 7,562,498 B2 * | 7/2009 | Galeazzo et al. | 52/198 |
| 7,592,537 B1 | 9/2009 | West | |
| 7,774,998 B2 * | 8/2010 | Aschenbrenner | 52/173.3 |
| 7,827,813 B2 | 11/2010 | Seem | |
| 7,856,769 B2 * | 12/2010 | Plaisted et al. | 52/173.3 |
| 7,896,000 B2 | 3/2011 | Nikiforov et al. | |
| 8,066,558 B2 | 11/2011 | Thomle et al. | |
| 8,096,140 B2 | 1/2012 | Seem | |
| 8,386,197 B1 * | 2/2013 | Plaisted et al. | 702/58 |
| D677,619 S | 3/2013 | Truthseeker et al. | |
| 2002/0117166 A1 | 8/2002 | Okumura | |
| 2003/0061773 A1* | 4/2003 | O'Leary | 52/173.3 |
| 2003/0154666 A1 | 8/2003 | Dinwoodie | |
| 2003/0172606 A1* | 9/2003 | Anderson | 52/302.1 |
| 2004/0154615 A1 | 8/2004 | Komano et al. | |
| 2004/0182432 A1 | 9/2004 | Yoda et al. | |
| 2005/0040250 A1 | 2/2005 | Wruck | |
| 2005/0061311 A1 | 3/2005 | Christensen | |
| 2005/0121068 A1* | 6/2005 | Sager et al. | 136/252 |
| 2005/0199278 A1 | 9/2005 | Aschenbrenner | |
| 2006/0005491 A1 | 1/2006 | Cooper et al. | |
| 2006/0117769 A1 | 6/2006 | Helt et al. | |
| 2006/0118163 A1 | 6/2006 | Plaisted et al. | |
| 2006/0158051 A1 | 7/2006 | Bartlett et al. | |
| 2007/0082601 A1 | 4/2007 | Desrochers et al. | |
| 2007/0100479 A1 | 5/2007 | Ahmed | |
| 2007/0155305 A1 | 7/2007 | Heidel et al. | |
| 2007/0167126 A1 | 7/2007 | Ghattas | |
| 2007/0251567 A1 | 11/2007 | Plaisted | |
| 2008/0010915 A1 | 1/2008 | Liebendorfer | |
| 2008/0087320 A1 | 4/2008 | Mapes et al. | |
| 2008/0096482 A1 | 4/2008 | Wettergren | |
| 2008/0172955 A1 | 7/2008 | McClintock et al. | |
| 2008/0179409 A1 | 7/2008 | Seem | |
| 2008/0289679 A1* | 11/2008 | Ressler | 136/244 |
| 2008/0302030 A1* | 12/2008 | Stancel et al. | 52/173.3 |
| 2008/0305030 A1* | 12/2008 | McKeigue et al. | 423/447.3 |
| 2009/0001179 A1 | 1/2009 | Dempsey | |
| 2009/0038668 A1 | 2/2009 | Plaisted | |
| 2009/0065046 A1 | 3/2009 | DeNault | |
| 2009/0081413 A1 | 3/2009 | Wilde et al. | |
| 2009/0090412 A1 | 4/2009 | Calwer et al. | |
| 2009/0113822 A1 | 5/2009 | Patrina et al. | |
| 2009/0114369 A1 | 5/2009 | Kammerzell | |
| 2009/0126382 A1 | 5/2009 | Rubino et al. | |
| 2009/0165843 A1* | 7/2009 | Horioka et al. | 136/251 |
| 2010/0132275 A1* | 6/2010 | Stanger | 52/173.3 |
| 2010/0140070 A1 | 6/2010 | Simard et al. | |
| 2010/0287867 A1 | 11/2010 | Constantino | |
| 2011/0036108 A1 | 2/2011 | Seem | |
| 2011/0056224 A1 | 3/2011 | Seem | |
| 2011/0151766 A1 | 6/2011 | Sherman et al. | |
| 2011/0174360 A1 | 7/2011 | Plaisted et al. | |
| 2011/0209742 A1 | 9/2011 | Narayanamurthy | |
| 2011/0223850 A1 | 9/2011 | Narayanamurthy et al. | |
| 2011/0238223 A1 | 9/2011 | Narayanamurthy et al. | |
| 2011/0257795 A1 | 10/2011 | Narayanamurthy et al. | |
| 2011/0276183 A1 | 11/2011 | Liu | |
| 2012/0024343 A1 | 2/2012 | Narayanamurthy | |
| 2012/0064818 A1 | 3/2012 | Kurelowech | |
| 2012/0079061 A1 | 3/2012 | Krebs | |
| 2012/0173209 A1 | 7/2012 | Krebs et al. | |
| 2012/0203562 A1 | 8/2012 | Krebs et al. | |
| 2012/0295534 A1 | 11/2012 | Narayanamurthy et al. | |
| 2013/0020267 A1 | 1/2013 | Plaisted et al. | |

FOREIGN PATENT DOCUMENTS

| | | |
|---|---|---|
| JP | 11062146 A | 3/1999 |
| KR | 2009103465 A | 10/2009 |
| WO | 2006076719 A2 | 7/2006 |
| WO | 2010144672 A1 | 12/2010 |

OTHER PUBLICATIONS

English machine translation of DE 3611542 A1, 2012.
English machine translation of JP H11-062146 A, retrieved 2013.
International Search Report and Written Opinion of PCT Application No. PCT/US2010/038123, dated Aug. 19, 2010, 10 pages total.
Office Action and List of References for U.S. Appl. No. 13/269,251 dated Aug. 2, 2012.

* cited by examiner

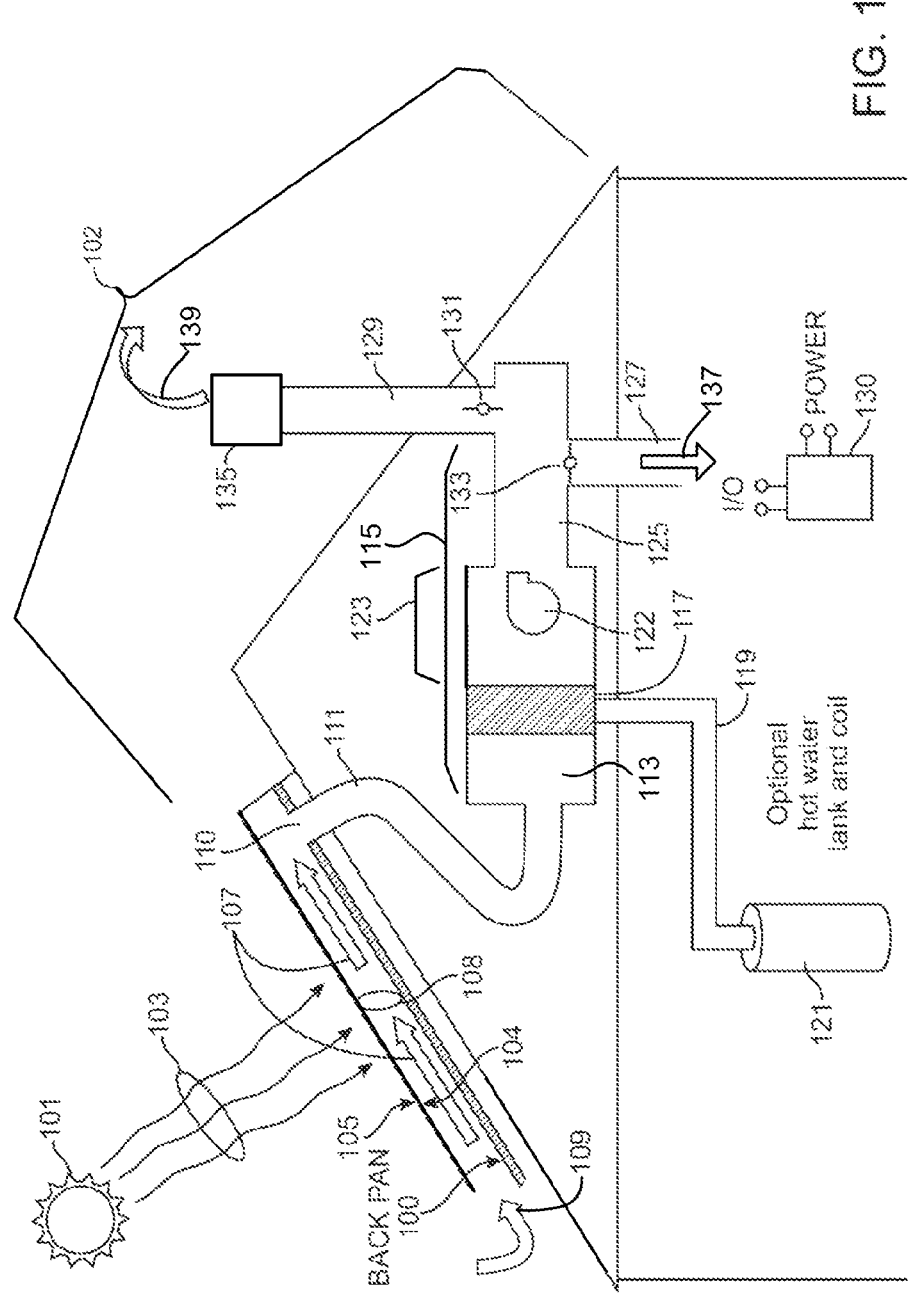

INTEGRATED THERMAL MODULE AND BACK PLATE STRUCTURE AND RELATED METHODS

CROSS-REFERENCE TO RELATED APPLICATIONS

This application claims priority from U.S. application Ser. No. 12/638,964, filed Dec. 15, 2009, which claims priority from U.S. Provisional Application No. 61/141,623, filed Dec. 30, 2008, commonly assigned, and incorporated by reference for all purposes herein.

BACKGROUND OF THE INVENTION

The present invention relates to operation of a thermal solar system. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in an average temperature of the Earth's air near its surface, which is projected to continue to increase at a rapid pace. Warming is believed to be caused by greenhouse cases, which are derived, in part, from use of fossil fuels. The increase in temperature is expected to cause a rise in temperature, extreme weather conditions, and higher sea levels. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

According to the present invention, techniques related to operation of a thermal solar system are provided. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

As further information for background reading, solar components are often secured into a basic frame structure to form a solar module. The solar module is commonly made of a laminated structure including cover glass, photovoltaic window and absorber material, and electrodes, which are spatially disposed in a frame structure. As an example, a plurality of modules are spatially positioned and secured in a mounting frame in an array configuration arranged in rows and columns. The array is often secured to a building structure or other spatial location. The solar array often includes an aperture region and an underside opening, which is spatially open, elevated, and free from impediments or confinements to allow air, heat, and water to pass and flow under or around the components, modules or array elements. Further details of the solar module can be found throughout the present specification and more particularly below.

According to a specific embodiment, solar components can include one or more of the following:

1. Photovoltaic sheet(s) to create electricity energy from the sun;
2. Conductive thermal sheet(s) to collect thermal energy from the sun;
3. Cover glass and frame for securing the photovoltaic and conductive thermal sheet;
4. Other components.

Of course, there can be other variations, modifications, and alternatives. As an example, modules serve one or more functions, including a solar function, a function maxillary to the solar functions, or a completely non-solar function for any type of purpose including but not necessarily limited to:

1. Solar electricity generating (photovoltaic) modules, panel, unit or assembly;
2. Solar thermal water heating, modules, panels, unit, or assembly;

3. Solar thermal air heating modules, panels, unit, or assembly;
4. Solar air conditioning or dehumidification of air; and
5. Other types of auxiliary modules serving any other type of function of purpose, and alternatives now know or in the future.

In a specific embodiment, the present invention provides an apparatus and method for a rack or frame that positions and holds the plurality of modules, including photovoltaic and/or thermal solar arrays. In one or more embodiments, the present rack or frame apparatus is formed by designs of rails, channels, struts, and other members having various designs and the like. In a specific embodiment, the rack or frame is typically affixed to a building structure such as a roof system or supported by a structural free standing ground frame or elevated frame system. In a preferred embodiment, the present invention provides a pan structure or device that serves as a lower region of a plenum for a thermal solar array. Of course, there can be various alternatives modifications, and variations.

In a specific embodiment, the present invention provides a novel apparatus and method for an array of solar modules. In one or more embodiments, the apparatus and method provides an underside region of solar components, modules, or array that is confined, closed in, or restricted using a thickness of shaped material or structure to form a "pan" shaped structure for the underside region of the array or the like. In a specific embodiment, the shaped material or structure is configured in one or more ways as briefly described below.
1. A pan structure under a single solar component or module;
2. A continuous pan structure under either or both a row or column of solar components or modules;
3. A continuous pan structure under a group of solar components or modules in a portion of one or more arrays;
4. A pan structure under an entire thermal or photovoltaic array to encompass and integrate each of the solar components; and
5. A pan structure coupled to or underling modules, racks, frames and other array components in part or whole.

Again, one of ordinary skill in the art would recognize other variations, modifications, and alternatives. In a specific embodiment, the shaped material or structure, configure as the pan, is made of a suitable material having environmental, thermal, and structural integrity and resistance. In a specific embodiment, the shaped material or structure is made from ferrous or non-ferrous metals, plastic, or any other suitable material, combination of materials, and or layers of materials. In one or more embodiments, the pan structure can be formed from a sheet or plate like material, or can be integrally formed from a frame, channel, strut, or other components to create its functional shape, attachment, positioning, rigidity, or integration under the solar components, modules, or arrays. Further details of the present method and apparatus including pan structure can be found throughout the present specification and more particularly below.

In a specific embodiment, the present invention provides a thermal solar system having a fire resistant characteristics. In a specific embodiment, the system includes a thermal solar module having an aperture region and a backside region. The system has a shaped thickness of material having a first side and a second side. In a preferred embodiment, the shaped thickness of material is characterized by a fire resistant material. The material has a thickness suitable to be free from penetration of moisture according to one or more embodiments. The thickness of material also has a structural characteristic capable of maintaining a shape and coupling to the backside region of the thermal solar module according to one or more embodiments. The system also has an air plenum provided between the thermal solar module and the thickness shaped thickness of material. In a preferred embodiment, the system further has a frame assembly operably coupled to the shaped thickness of material to support the shaped thickness of material and the thermal solar module or other alternative module types.

In an alternative specific embodiment, the present invention provides a method of installing a solar module onto a building structure. In a specific embodiment, the method includes mounting a frame assembly integrally coupled with one or more pan structures to a building structure. As used herein, the term "pan" or "pan structure" is interpreted by ordinary meaning and should not unduly limit the scope of the claims herein to the explicit wording in the specification and features in the drawings. One of ordinary skill in the art would recognize other variations, modifications, and alternatives. In a specific embodiment, the present method includes coupling one or more solar modules comprising an aperture region and a backside region within the frame assembly such that the backside region and the one or more pan structures form a plenum region for fluid flow. Of course, there can be other variations, modifications, and alternatives.

In a specific embodiment, the present invention provides a thermal solar system having a fire resistant characteristic. The system includes a solar module having an aperture region and a backside region. The system has a shaped thickness of material having a first side and a second side. In a specific embodiment, the shaped thickness of material is characterized by a fire resistant characteristic including a thickness to be free from penetration of moisture. In a specific embodiment, the thickness of material has a structural characteristic capable of maintaining a shape and coupling to the backside region of the thermal solar module. The system also has an air plenum provided between the thermal solar module and the thickness shaped thickness of material and a frame assembly operably coupled to the shaped thickness of material to support the shaped thickness of material and the thermal solar module. The system also has a building structure holding the frame assembly. In a preferred embodiment, the building structure has an inner region having a first pressure. In one or more embodiments, the inner region can be an attic region or other inner building region or regions. In a specific embodiment, the system has a second pressure characterizing the air plenum. In a specific embodiment, the second pressure is equal to or less than the first pressure to cause a dynamic pressure on the solar module to be directed through the air plenum. In a preferred embodiment, the second pressure maintains the inner region of the building structure substantially free from water driven from the dynamic pressure during rain fall or wind.

Many benefits are achieved by way of the present invention over conventional techniques. For example, the present technique provides an easy to use process that relies upon conventional technologies such as thermal solar modules and drive devices, although other elements can also be used. Additionally, the method provides a process that is compatible with the instant thermal solar system without substantial modifications to equipment and processes. Preferably, the invention provides for an improved solar module operation procedure, which is less costly and easy to handle. Such solar module operation system uses a shaped material or structure in the form of a pan, which is configured underlying a solar array, including its components, and integral with a rack structure according to one or more embodiments. In a preferred embodiment, the pan structure can be composed of a plurality of individual segments, which can be interconnected in a locking manner to form a continuous shaped structure underlying a solar array. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIG. 1 is a simplified diagram of a thermal solar system according to an embodiment of the present invention;

DETAILED DESCRIPTION OF THE INVENTION

Figure 1A:
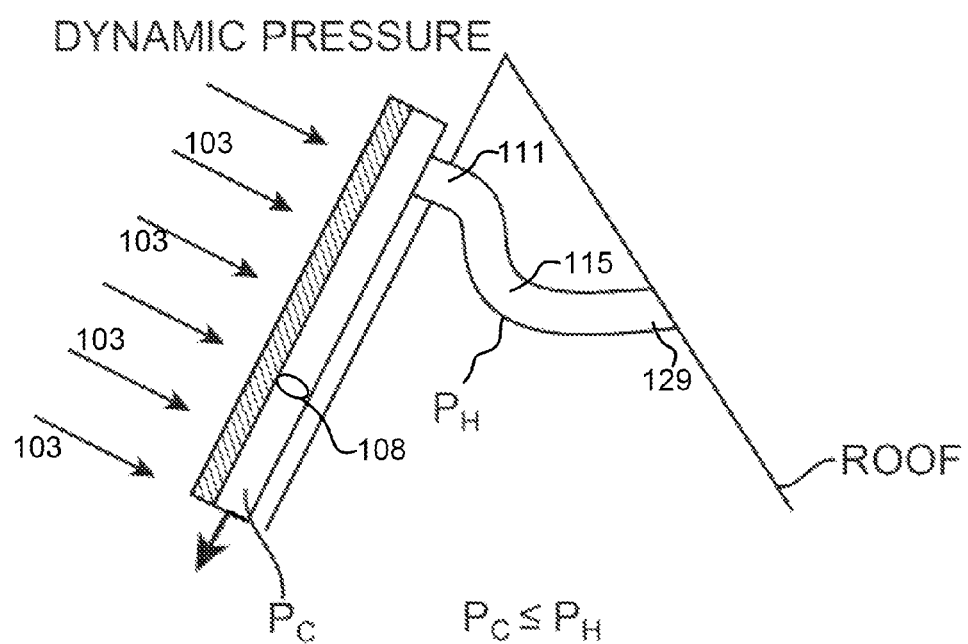
FIG. 1A is a simplified diagram of a velocity profile of a thermal solar system according to an embodiment of the present invention.

According to the present invention, techniques related to operation of a thermal solar system are provided. More particularly, the present invention provides a method and system for using a back plate structure to form a plenum for a thermal solar system. Merely, by way of example, the present invention has been applied to a thermal solar module configured on a building structure, but it would be recognized that the invention has a much broader range of applications.

FIG. 1 is a simplified diagram of a back plate structure 100 for a thermal solar system according to an embodiment of the present invention. This diagram is merely an example, which should not unduly limit the scope of the claims herein. One of ordinary skill in the art would recognize other variations, modifications, and alternatives. As shown, the thermal solar system 102 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules is configured to form a receiver (aperture) region 105 and a backside region 104. In one or more embodiments, the thermal solar modules can be combined with photovoltaic modules or solely thermal modules or photovoltaic modules configured for thermal use to provide a heat source. Of course, there can be other variations, modifications, and alternatives.

In a specific embodiment, electromagnetic radiation 103 from the sun 101 or other radiation source illuminates on the receiver region. In one or more embodiments, thermal energy is transferred through the solar module and applies the thermal energy to a working fluid 109 such as air, which traverses 107 in an upward direction through an air plenum 108 configured from at least the backside region. In a specific embodiment, the air plenum has one or more intake regions and one or more exit regions 110. In a specific embodiment, the one or more intake regions can be configured near a lower portion of the solar module array, although there can be other spatial locations. Additionally, the one or more plenum exit regions can be a single exit region or multiple exit regions disposed spatially in a configuration near an upper portion of the solar module array. Of course, there can be other variations, modifications, and alternatives.

In a specific embodiment, the present system includes a shaped structure or thickness of material coupled to the backside region to form the plenum. In a specific embodiment, the shaped structure is integrally configured with the rack structure or disposed underlying the various components of the solar module or thermal array. In a specific embodiment, the shaped structure or thickness of material can be the pan structure coupled to the backside region. In a preferred embodiment, the shaped pan structure has a suitable thickness, configuration and form to prevent rain water or moisture from penetrating from the plenum region through the pan, but can also be vented according to one or more embodiments. Further details of the shaped structure can be found throughout the present specification and more particularly below in reference to FIGS. 5 through 13. Of course, there can be other variations, modifications, and alternatives.

Referring again to FIG. 1, the system has a first duct 111 coupled to the one or more plenum exit regions 110. In a specific embodiment, the first duct can couple into a fluid flow region 115 having a fluid flow intake region 113 coupled to the first duct region, a fluid flow exit region 125, and a fluid drive region 123 spatially disposed between the fluid flow intake region and the fluid flow exit output region. As used herein, the terms "fluid exit region" "fluid flow intake region" "fluid drive region" and others are not intended to be limiting and should be interpreted by ordinary meaning. Also shown are valves or dampers 131 and 133 which respectively connect to air pathways 129 and 127 to an outside region via exhaust 135 for dumping exhaust air 139 or back into a building structure via exhaust 127 for providing heated air 137. Of course, there can be other variations, modifications, and alternatives.

In a specific embodiment, the system has an air moving device 122 comprising a drive device coupled to a blower device. In a preferred embodiment, the drive device is spatially disposed within the fluid drive region. In a specific embodiment, the drive device comprises an electric motor. That is, the drive device comprises an electric motor with high temperature windings, but can be others. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 240 Degrees Fahrenheit.

In a specific embodiment, the system has one or more sensing device coupled to the controller device 130. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. Of course, there are other variations, modifications, and alternatives.

In a specific embodiment, the system also has a controller 130 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. Of course, there can be other variations, modifications, and alternatives.

Referring again to FIG. 1, the system has a second duct 125 coupled to the fluid flow exit region. As shown, the system can also include a heat exchanger 117 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 119, which preheats a fluid, such as water for the hot water tank 121 or other heating apparatus. Further details of the present system and related methods can be found throughout the present specification and more particularly below.

In a specific embodiment as illustrated by FIG. 1A, the present invention provides a thermal solar system having a fire resistant characteristic. The system includes a solar module having an aperture region and a backside region. The system has a shaped thickness of material having a first side and a second side. In a specific embodiment, the shaped thickness of material is characterized by a fire resistant characteristic including a thickness to be free from penetration of moisture. In a specific embodiment, the thickness of material has a structural characteristic capable of maintaining a shape and coupling to the backside region of the thermal solar module. The system also has an air plenum provided between the thermal solar module and the thickness shaped thickness of material and a frame assembly operably coupled to the shaped thickness of material to support the shaped thickness of material and the thermal solar module.

As shown, the system also has a building structure holding the frame assembly. In a preferred embodiment, the building structure has an inner region having a first pressure. In one or more embodiments, the inner region can be an attic region or other inner building region or regions. In a specific embodiment, the system has a second pressure characterizing the air plenum. In a specific embodiment, the second pressure is equal to or less than the first pressure to cause a dynamic pressure on the solar module to be directed through the air plenum. In a preferred embodiment, the second pressure maintains the inner region of the building structure substantially free from water driven from the dynamic pressure during rain fall or wind. That is, high wind and rain subjecting the aperture region cause water droplets to migrate into the plenum, which is at a lower pressure in the plenum region in reference to the inner building structure. In a preferred embodiment, the inner building structure is maintained free from moisture and water droplets. A detailed description of the present rack structure and thermal solar module are described more particularly below.

Figure 2:
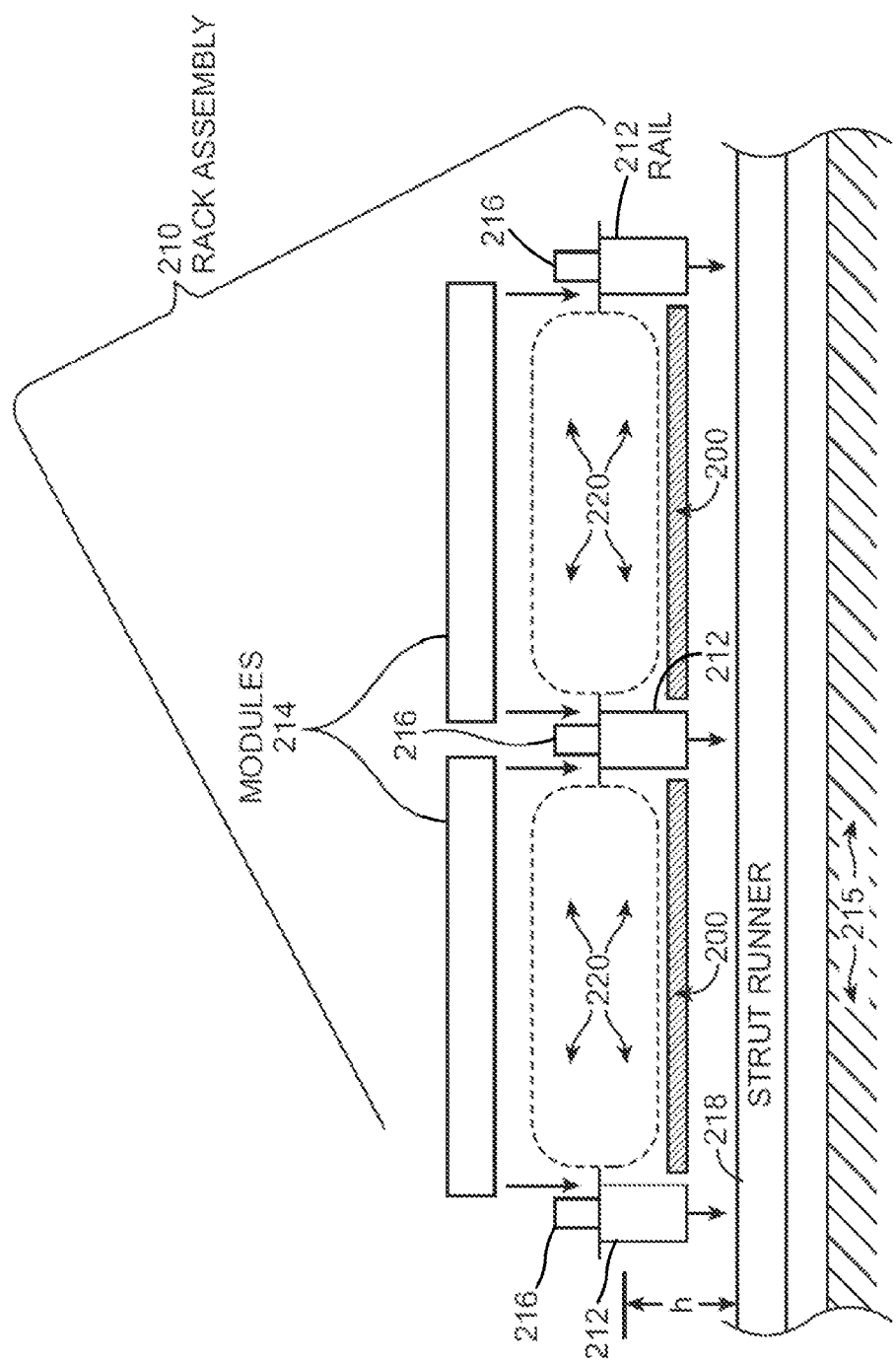
FIG. 2 is a simplified side view diagram of a rack assembly for a solar system according to an embodiment of the present invention.

FIG. 2 is a simplified side view diagram of a rack assembly for a solar system according to an embodiment of the present invention. This diagram is merely an example, which should not unduly limit the scope of the claims herein. One of ordinary skill in the art would recognize other variations, modifications, and alternatives. As shown, the rack assembly is form supporting solar modules, under one or more embodiments of the invention. In a specific embodiment, the rack assembly 210 includes a plurality of rail structures 212 that provide support for individual solar modules 214. When installed, the rail structures 212 support the individual solar modules 214 a given height h above an underlying body 215. The underlying body 215 may correspond to any surface, platform or structure on which solar modules 214 are mounted. For example, underlying body 215 may correspond to a rooftop of a commercial or residential building or other suitable configuration of beams, mounts, rails or other structure. The solar modules 214 may correspond to photovoltaic solar cells that convert solar energy into electricity, or alternatively, solar heating modules which directly generate heat using solar energy. Alternatively, the solar cells can be a combination of photovoltaic and thermal modules according to one or more embodiments.

According to one or more embodiments, the rail structures 212 are adjustable pair-wise, or in other combinations, in order to hold in place solar modules 214 of various dimensions and sizes. In one or more embodiments, the solar modules 214 are supported by a combination of retention structures 216. Each retention structure 216 may be provided with a corresponding one of the rail structures 212. In one or more embodiments, each retention structure 216 is a structural feature of the corresponding rail structure 212. For example, each rail structure 212 may comprise of multiple interconnected segments, and the retention structure(s) may be one of the interconnected elements. Alternatively, the retention structures 216 may be integrated or unitarily formed with the individual rail structures 212. Each retention structure 216 supports individual solar modules 214 by grasping edge segments. In one or more embodiments, the retention structures 216 and/or rail structures 212 are adjustable to grasp and support solar modules 214 of varying thicknesses and forms an air passage or plenum. In a preferred embodiment, as illustrated by way of FIG. 2A, retention structures include a recessed region 216A, which extends along a length of the retention structure. Each of the recessed regions can act as a drain for water or fluid flow upon impact from rain, snow, or other entities that lead to fluids. Referring again to FIG. 2, an embodiment provides that a back plate structure 200 forms an air passage region or plenum 220 at the back side of the module 214. Of course, there can be other variations.

Figure 2A:
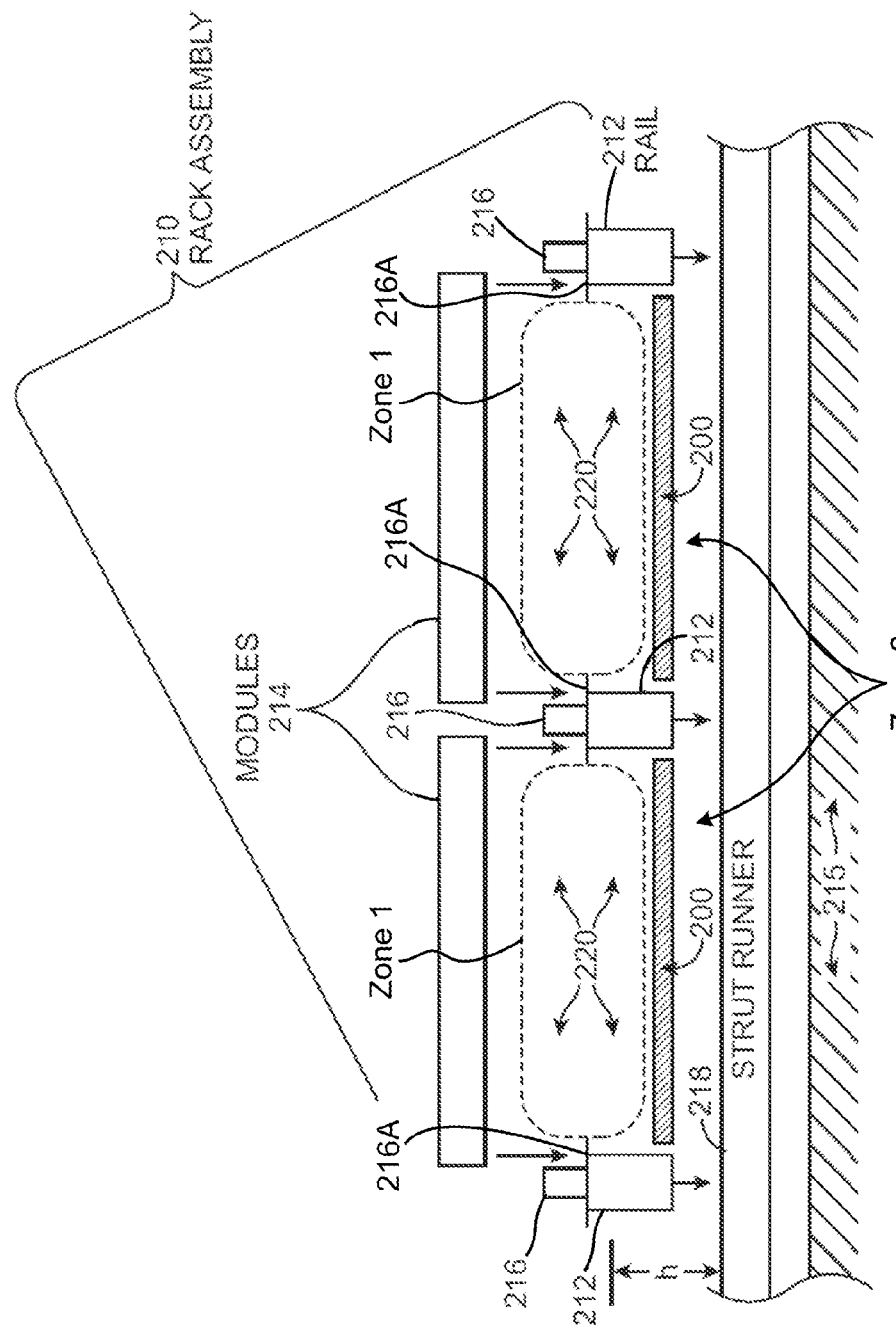
FIG. 2A is a simplified side-view diagram of a solar system according to an embodiment of the present invention.

In a specific embodiment, the present solar modules include at least two regions on each side of the shaped structure or pan structure, as illustrated by a simplified diagram of FIG. 2A. In a specific embodiment, the two regions includes an upper region (Zone 1) located between the module and the intermediate shaped structure; and a lower region (Zone 2) located between the intermediate shaped structure and a portion of the roof or alternative underlying surface or area. In a specific embodiment, Zone 2 provides for cooling of the panel using trapped air confined with a secondary surface for further insulation to reduce temperature of a roof and provides a barrier to prevent fire propagation. In a specific embodiment, the present solar modules can be configured to cool the solar modules in one cavity and heat the solar modules from another cavity (or zone). Using the shaped structure or pan structure, each of the cavities are decoupled from each other. In a specific embodiment, the shaped structure or pan, if metal, is free from contact with a portion of the roof structure. In a preferred embodiment, Zone 2 provides for break for fire, a thermal break, or additional insulation, which is similar to a triple plane or glaze insulation. Of course, there can be other variations, modifications, and alternatives.

In a specific embodiment, the two zones can act in conjunction or independently to provide for differing and independent functions, e.g., thermal conductivities, insulating effect, control of static pressures air flows, etc. Depending upon the embodiment, the two zones may act in unison or in opposition of each other. In a specific embodiment, one of the zones may be removing heat while the other zone is adding heat. Of course, there can be other variations, modifications, and alternatives.

In a specific embodiment, the upper zone provides for a thermal recovery cavity under the modules. The lower zone could operate independently to insulate the structure from heat transfer downward by maintaining cool air flow under the shaped structure. In a specific embodiment, the lower zone would prevent or limit high roof temperatures and heat transfer to the structure below. In a specific embodiment, the lower region Zone 2 could function as insulating in either summer (hot) and winter (cold) environments. In the summer, the roof and/or module becomes hot and the lower zone may be used to prevent the heat from passing downward. Cool, exterior air, would pass through the lower zone and carry away the heat to the roof ridge vent and flow it to the exterior (e.g., a thermal shield function). Additionally, the underside of the intermediate pan would have a "low-e" surface so it does not radiate heat downward into the structure. In winter, the system may maintain the heat at the underside of the intermediate pan. The Lower Region (Zone 2) would act as a static dead air space to hold the heat in the system. As the system increases in temperature, the air space would function as a "thermal break" to slow heat from the structure passing through. Of course, there can be other variations, modifications, and alternatives.

In a specific embodiment, the two zones can also be configured for condensation control. The two zones can be thermally controlled to prevent a condition where warm lower air encounters a cold surface. In such situations, condensation forms. Such condensation accumulated on the underside and forms water droplets. These water droplets lead to wetness and damage to the structure below. In open steel roof systems, the condensate falls on the ground or within the building structure or everything else placed in the air space. In a specific embodiment, the two zones can be configured to control condensation and other parameters that may cause undesirable influences. Of course, there can be other variations, modifications, and alternatives.

Referring again to FIG. 2, an embodiment provides that rail structures 212 are mounted indirectly to the underlying body 215 through use of a set of strut runners 218. Each strut runner 218 mounts to the underlying body 215 and to multiple rail structures 212, thus providing lateral support to maintaining the rail structures 212 upright, while at the same time providing a buffer between the individual rail structures 212 and the underlying body 215. The rail structures 212 may mount to the strut runners 218, and the strut runners may mount to the underlying body 215.

According to an embodiment, the rack assembly 210 forms a portion of a solar heat exchange system that uses heat generated from the solar modules 214 for any one of various useful purposes. The heat exchange may be enabled by the formation of one or more plenum 220 between an underside of solar modules 214 and the underlying body 215. An individual plenum 220 may be defined in part by one or more of the rail structures 212, as well as the underlying body and possibly the underside of the solar modules 214. The individual plenum 220 may occupy at least a portion of the thickness defined by the height h. The solar heat exchange system may further include other components, such as a plurality of thermal panels, as well as air directors that draw air into the plenum 220, and/or push the air through the plenum. When installed as part of a solar heat exchange system, the rack assembly 210 may be positioned to supply heated air to such air directors, and to be proximate to the environment that is to receive or use the heated air. For example, the rack assembly 210 may be installed on the rooftop of a dwelling, and also direct heated air into a vent or air circulation system of the dwelling as part of its ability to heat air in the plenum 220. Useful purposes for generating heat from the solar modules 214 may include, for example, any one or more of the following: (i) cooling the individual solar modules 214 (when photovoltaic) so as to make them more efficient, (ii) pulling air from the environment underneath the solar modules 214 for purpose of heating the air for another closed environment or system (e.g. for a house), and (iii) circulating air from the closed environment or system underneath the solar modules 214 to heat that air and use it for heat. Of course, there can be other variations, modifications, and alternatives.

Figure 3:
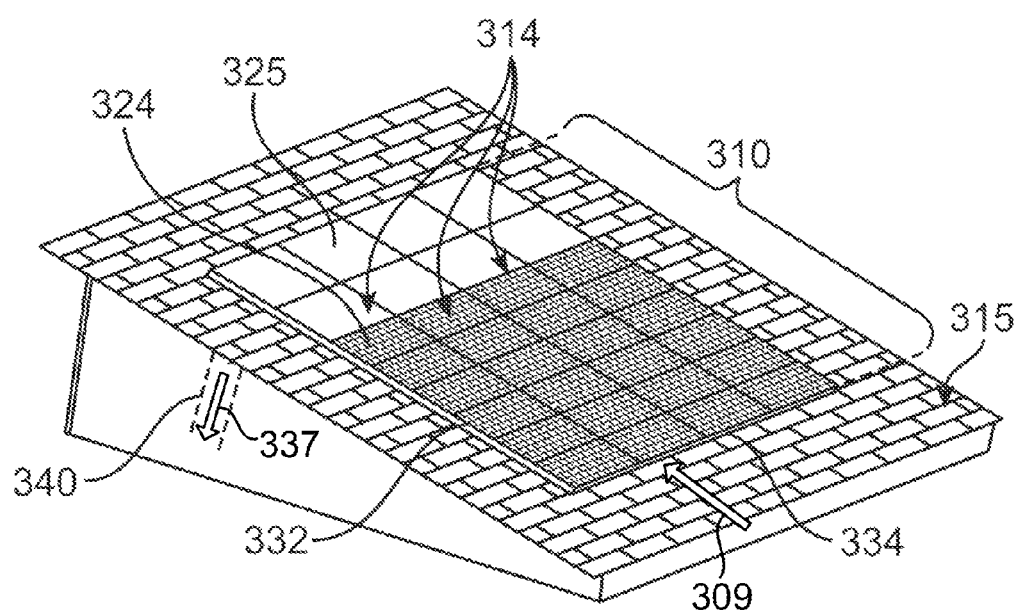
FIG. 3 is a simplified perspective view diagram of a solar system according to an embodiment of the present invention.

FIG. 3 is a simplified perspective view diagram of a solar system according to an embodiment of the present invention. This diagram is merely an example, which should not unduly limit the scope of the claims herein. One of ordinary skill in the art would recognize other variations, modifications, and alternatives. As shown, the rack assembly 310, which is installed, that supports a set of solar modules 314 over an underlying body 315. The rack assembly 310 may be structured and adapted to include features such as described with one or more embodiments of the invention. The underlying body 315 may correspond to, for example, a rooftop or roof structure of a building or dwelling. In general, the underlying body 315 may correspond to any area, surface or platform that can receive sunlight and be connected to a building, place or location that can collect or use the solar energy.

Embodiments of the invention contemplate that different types of solar modules 314 may be employed in various implementations and context. For example, as shown by the simplified diagram of FIG. 3, the solar modules 314 include photovoltaic modules 324 and thermal modules 325. Under one or more embodiments, the perimeter may include one or more open length 334 from which air from the environment is drawn. As will be described, plenums (not shown) may be provided between the rack assembly 310 and underlying body 315 for purpose of constraining airflow. Air drivers (not show) may drive (e.g. push or pull) air within the formed plenums. In a specific embodiment, the rack assemble 310 can include one or more sealed length 332, or in a specific embodiment the back plate (not shown) may be provided to confine and create the air plenum. The solar modules 314 generate heat, either through design or as an inherent byproduct. According to one or more embodiments, this heat warms the air as it is drawn from the environment and pulled through the plenums formed underneath the solar modules 314.

Numerous alternatives and variations are contemplated. For example, all of the perimeter of the rack assembly 310 may be sealed, but may also not be sealed, and air may drawn from within a dwelling on which the rack assembly 310 is provided. This air may be pushed through-plenums, then back into the dwelling when warmed. Alternatively, some or all of the open length 334 may be sealed, or conversely, portions of the sealed lengths 132 may be opened or perforated as part of an underlying plenum system. As shown, FIG. 3 illustrates an implementation in which heated air is directed into a duct 340 within a structure of the underlying body 315. For example, warm air may heat a dwelling on which the rack assembly 310 is installed, and the duct 340 enables the heated air to flow into the circulation system of the dwelling. As mentioned, the solar modules 314 may be formed by a combination of the photovoltaic modules 324 and the thermal modules 325. The photovoltaic modules 324 can generate some residual heat when receiving solar energy and converting the solar energy into electrical current. In contrast, the thermal modules 325 may directly convert the solar energy into heat at a higher efficiency. The use and number of thermal modules 325 may depend on the use of the heated airflow, as well as the environment where the rack assembly 310 is installed. For example, when the purpose of heating air in the channels is to supply warm air to a dwelling of the underlying body 315, the thermal modules 325 have more use in colder environments, while warm environments may require only use of photovoltaic modules 324. Even in cold environments, thermal modules 325 may be used to convert solar energy into hot air due to the high operating efficiency achieved by their designs, and additional components may be used to drive the hot air into the dwelling.

Figure 4:
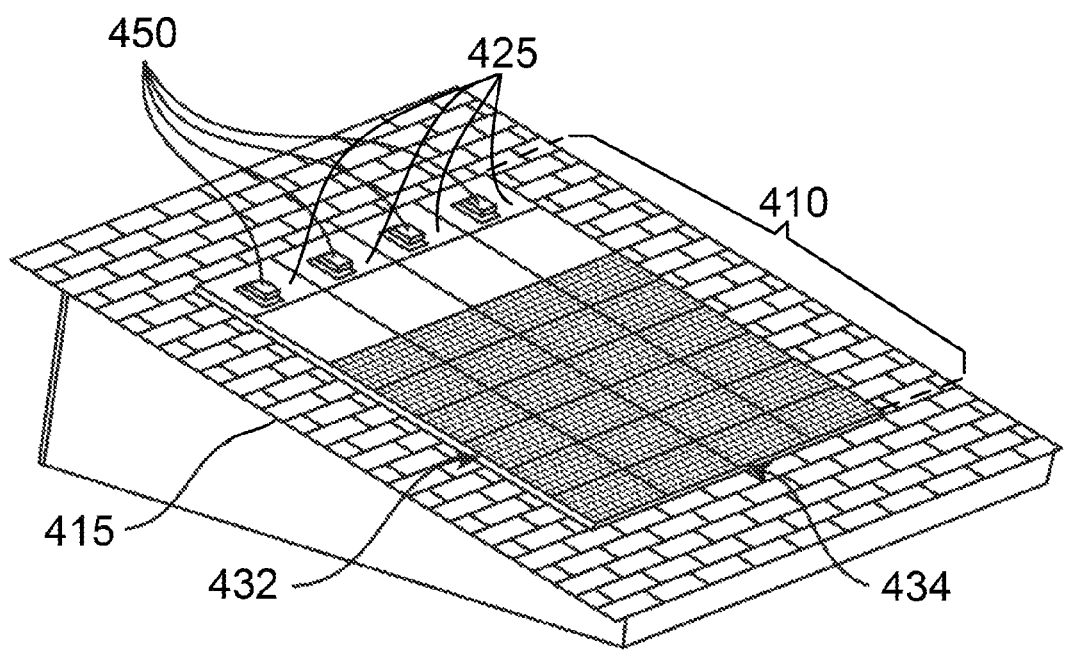
FIG. 4 is a simplified perspective view diagram of a solar system according to an alternative embodiment of the present invention.

FIG. 4 is a simplified perspective view diagram of a solar system according to an embodiment of the present invention. The Figure illustrates an implementation in which, multiple ventilation outlets 450 may be employed for directing heated air from under the rack assembly. As such, the ventilation outlets are located underneath the thermal modules 425. As shown with FIG. 4, the open length 434 of the perimeter is provided on one side, and the series of vents 450 are provided lengthwise on the other side of the perimeter formed by the rack assembly 410. For example, the vents 450 may guide the directed heated air inward into the structure of the underlying body 445. Of course, there can be other variations, modifications, and alternatives. As merely an example, further details of the rack assembly can be found in United States Patent Application Publication 20060118163 A1 in the names of Joshua Reed Plaisted, et al., commonly assigned, and hereby incorporated by reference herein. Of course, there can be other variations, modifications, and alternatives. Further details of the shaped structure underlying the solar array are described throughout the present specification and more particularly below.

Figure 5:
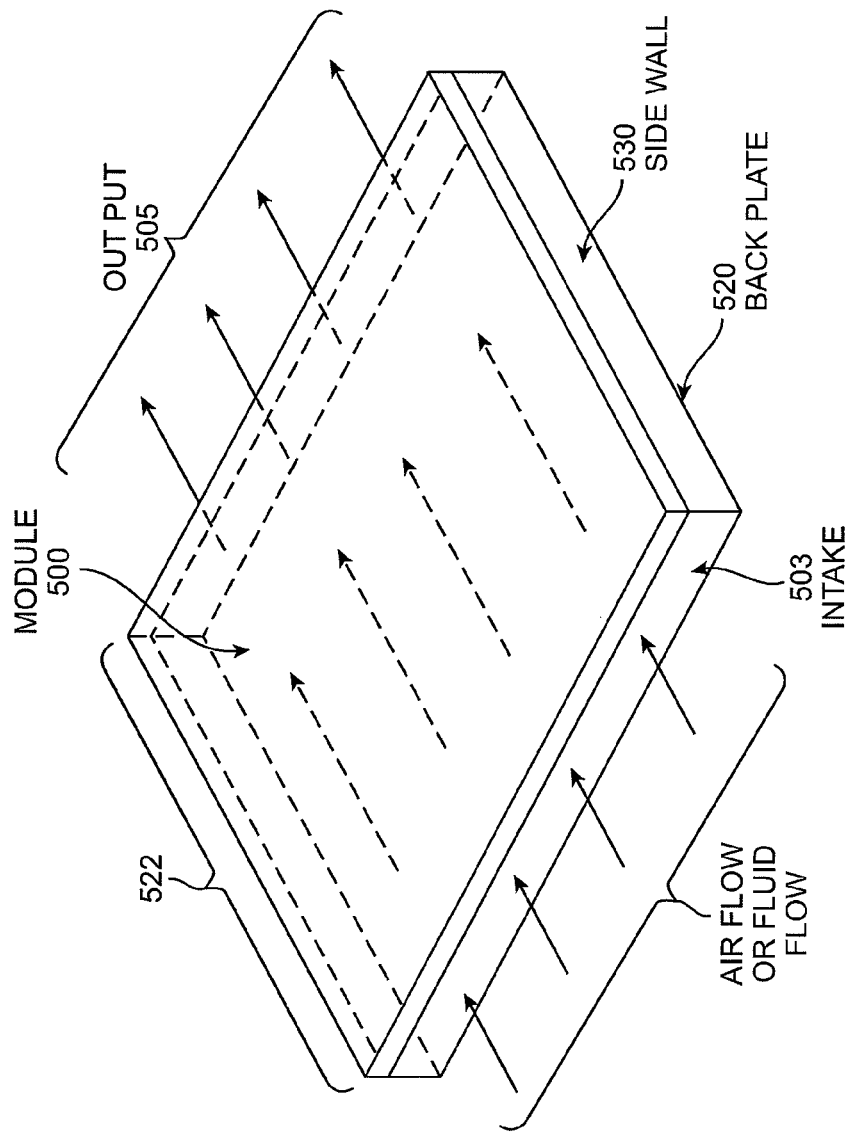
FIG. 5 is a simplified diagram of a pan structure for a thermal solar system according to an embodiment of the present invention.

FIG. 5 is a simplified diagram of a back plate structure 520 for a thermal solar system according to an embodiment of the present invention. This diagram is merely an example, which should not unduly limit the scope of the claims herein. One of ordinary skill in the art would recognize other variations, modifications, and alternatives. As shown is a rigid integrated pan structure, which couples to a backside of the solar module 500, or array according to a specific embodiment. In a specific embodiment, the rigid integrated pan structure is preferably a shaped thickness of material 520 having a first side and a second side. In a preferred embodiment, the shaped thickness of material is characterized by a fire resistant material, but can be others. The material has a thickness, form and connections, suitable to be free from penetration of moisture according to one or more embodiments. Of course, there can be other variations, modifications, and alternatives.

The thickness of material also has a structural characteristic capable of maintaining a shape and coupling to the backside region of the thermal solar module according to one or more embodiments. In a specific embodiment, the shaped thickness of material or shaped structure includes sidewall regions 530, which face parallel to each other, and intake 503 and exhaust regions 505, which also face parallel to each other. In a preferred embodiment, the shaped thickness of material or shaped structure can be a single continuous member or be one of a plurality of like structures that are coupled to each other to form a larger shaped structure, which is integral to the rack and solar module array. Further details of the larger shaped structure can be found throughout the present specification and more particularly below.

Figure 6:
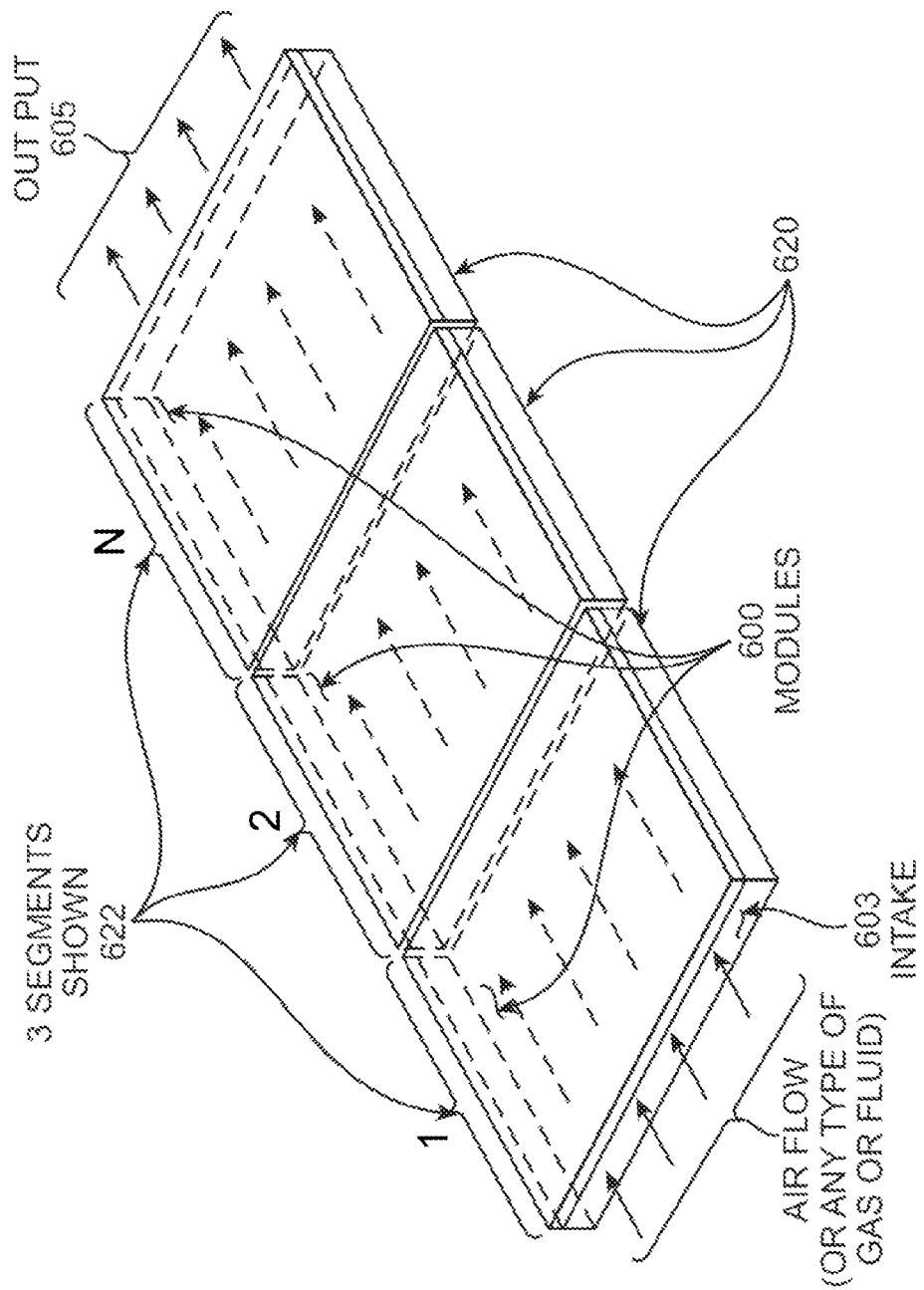
FIG. 6 is a simplified diagram of a pan structure for a thermal solar system according to an alternative embodiment of the present invention.

FIG. 6 is a simplified diagram showing a series of a back plate structure 620 for a thermal solar system according to an alternative embodiment of the present invention. This diagram is merely an example, which should not unduly limit the scope of the claims herein. One of ordinary skill in the art would recognize other variations, modifications, and alternatives. As shown, each of the segments 622 operably coupled to each other to form an integrated shaped structure, numbered 1 through N, where N is an integer greater than 2, extending from an intake region 603 to an output region 605. In a specific embodiment, the integrated shaped structure operably couples to the rack, solar module 600 or array. In a preferred embodiment, each of the segments is manufactured separately and installed either on the roof, raised frame, or on the ground. Each of the segments includes a border region for structural support according to a specific embodiment. Again, there can be other variations, modifications, and alternatives.

Figure 7:
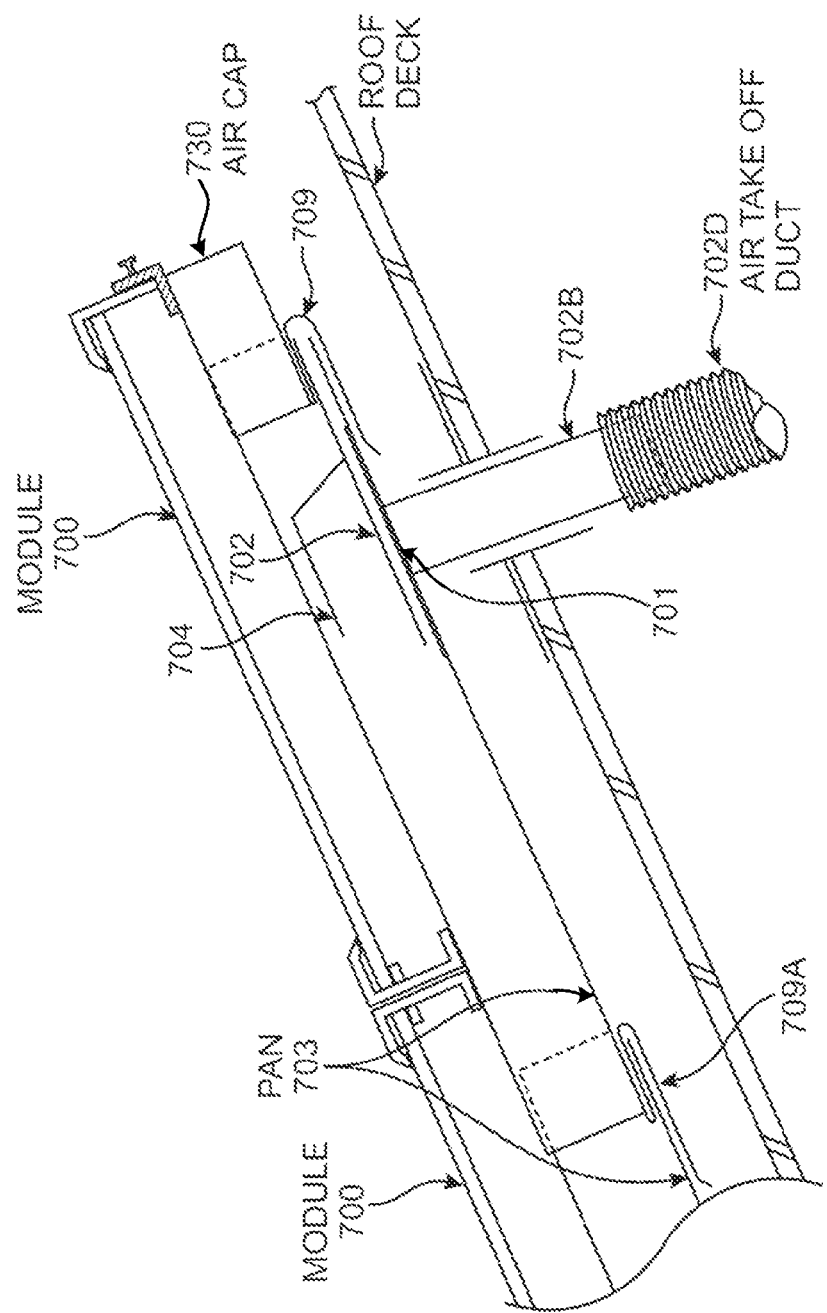
FIG. 7 a simplified diagram of side view cutaway of a solar module and pan structure according to an embodiment of the present invention.

FIG. 7 a simplified diagram of side view cutaway of a solar module and back plate pan structure according to an embodiment of the present invention. This diagram is merely an example, which should not unduly limit the scope of the claims herein. One of ordinary skill in the art would recognize other variations, modifications, and alternatives. As shown, the cut away includes modules 700 with under pan 703 structure according to an embodiment of the present invention. In a specific embodiment, an opening 701 is formed or cut through the pan structure 703 and the air take-off assembly 702 is inserted an air take off duct 702B through that opening, as shown. In a specific embodiment, the cutaway illustrates an air take off duct 702D attached to the air take off duct 702B, which can be a single duct or multiple duct assemblies according other embodiments. In a specific embodiment, the cut away also includes a protective water flashing assembly 704, which laps or covers the air take-off assembly. Depending upon the embodiment, a plurality of openings and respective ducts can also be configured on a lower region of the pan structure. Of course, there can be other variations, modifications, and alternatives.

In a specific embodiment, an upper edge of a water protective flashing is inserted into the "S" seam as located above a special region shown by reference numeral 709. In a specific embodiment, the top of the pan air stop or "air-cap" 730 is attached to the top of the pan assembly to seal the end portion of the pan assembly. In a specific embodiment, the pan assembly includes a plurality of pan structures, which couple to each other using an "S" seam 709A or can be lapped or configured with another suitable connection or attachment device. Also shown is the building structure or roof according to a specific embodiment. Of course, there can be other variations, modifications, and alternatives.

Figure 8:
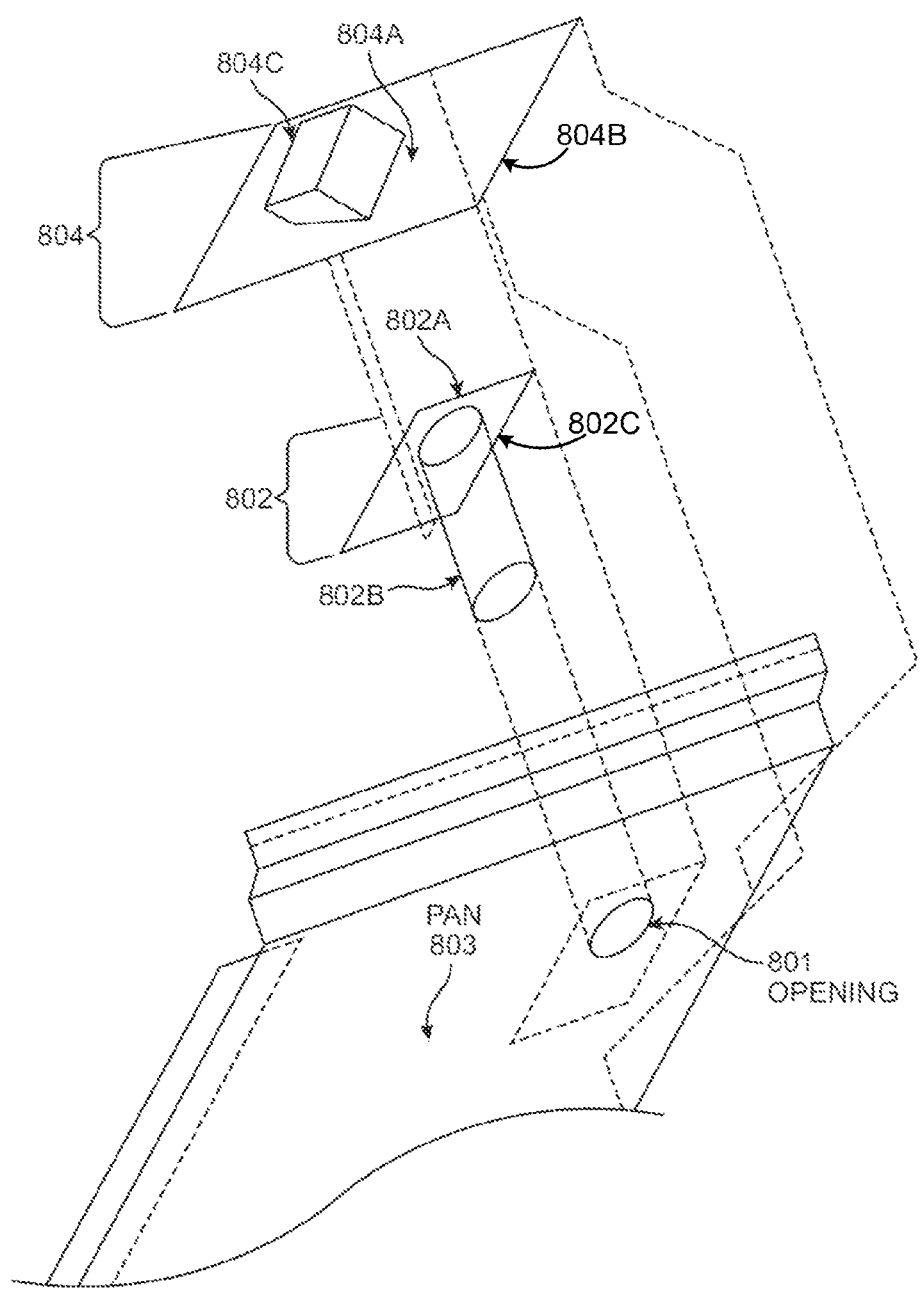
FIG. 8 is a simplified assembly diagram of a pan structure and associated ducting according to an embodiment of the present invention.
Figure 9:
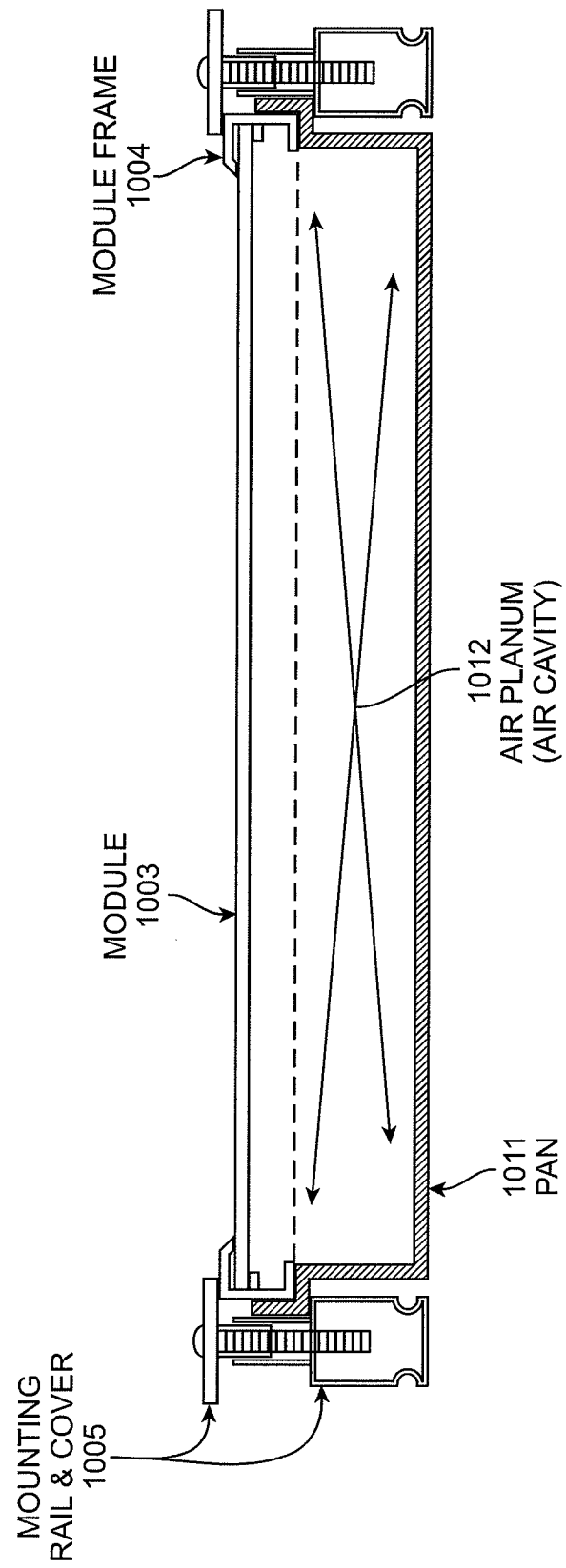
FIGS. 9 through 12 are simplified side-view diagrams of pan structures according to alternative embodiments of the present invention.
Figure 10:
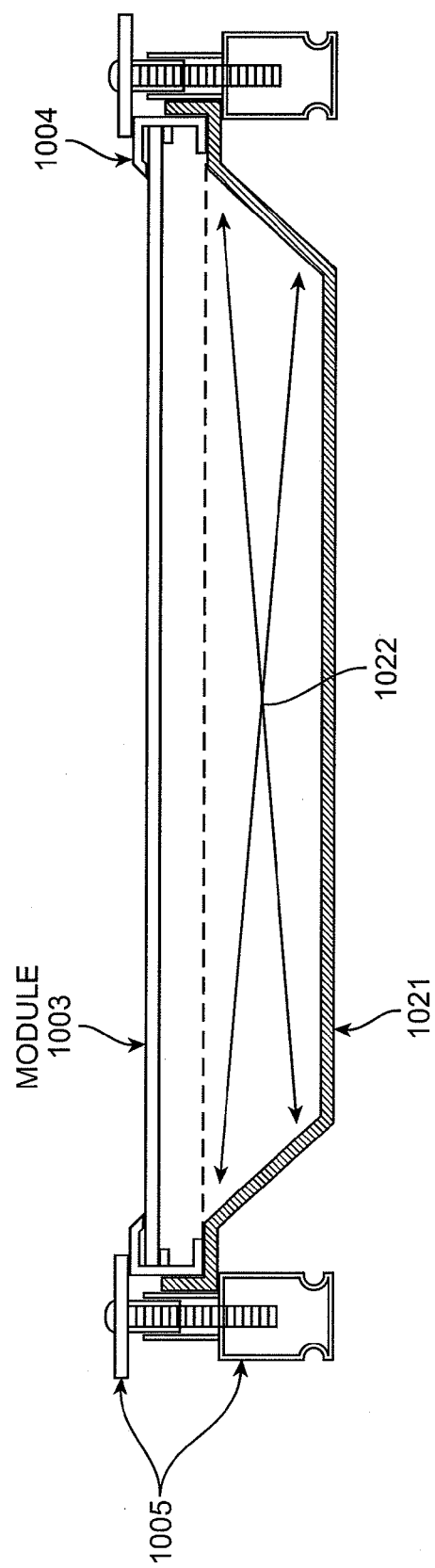
Figure 11:
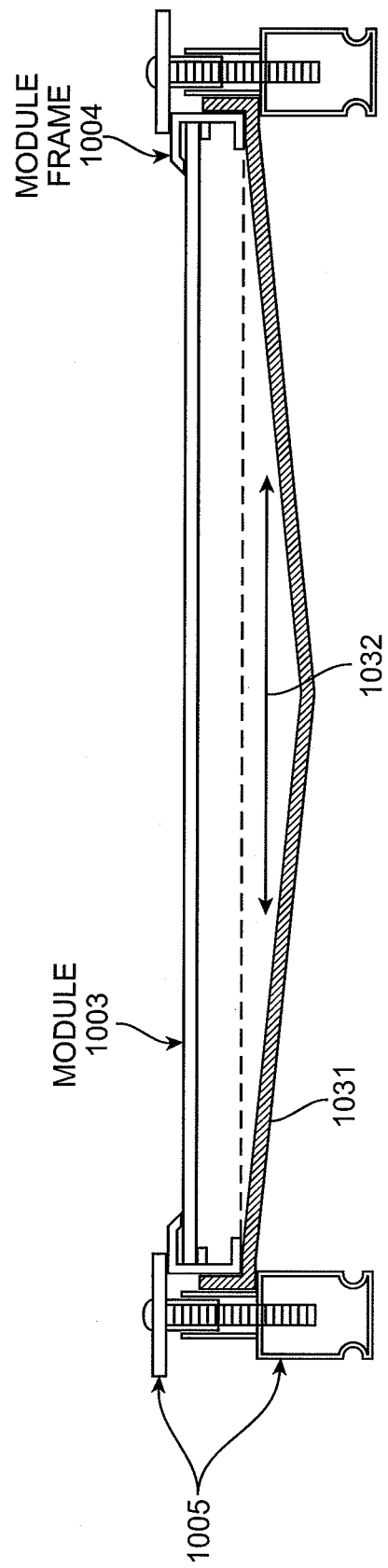

FIG. 8 is a simplified assembly diagram of a pan structure and associated ducting according to an embodiment of the present invention. This diagram is merely an example, which should not unduly limit the scope of the claims herein. One of ordinary skill in the art would recognize other variations, modifications, and alternatives. As shown, the assembly diagram illustrates alignment and installation of one or more elements including an air takeoff assembly, protective water flashing, among other features. In a specific embodiment, the assembly diagram includes an opening or hole cut 801 within a pan structure. In a specific embodiment, the hole cut in the pan provides an opening for air takeoff duct to pass through, although there can be other uses. As also shown is an air takeoff assembly 802, which includes top edge of flashing skirt 802A, air takeoff duct 802B, lower edge of flashing skirt 802C, among other features. In a specific embodiment, the pan includes a portion 803 of the under pan structure. Of course, there can be other variations, modifications, and alternatives.

In a specific embodiment, the protective water flashing assembly 804 for an upper edge of air takeoff assembly 802A is also illustrated. The assembly includes an upper edge of protective flashing 804A, which is aligned with the top edge of the pan structure according to a specific embodiment. The assembly also has a lower edge of protective flashing 804B, which laps over the top edge 802A of the air takeoff assembly according to a specific embodiment. Also shown is an air intake flashing 804C, which covers the opening 801 passed by the air take off assembly 802. Further details of alternative pan structures in side-view diagrams are illustrated below.

FIGS. 9 through 12 are simplified side-view diagrams of pan structures according to alternative embodiments of the present invention. These diagrams are merely examples, which should not unduly limit the scope of the claims herein. One of ordinary skill in the art would recognize other variations, modifications, and alternatives. In a specific embodiment, an air cavity or air plenum is formed under one or more solar modules or other modules. In a specific embodiment, the present invention provides a system for a pan under a solar component, module, or array. In other embodiments, an air cavity is within a solar component, module, or array. In one or more embodiments, the pan structure and air cavity are characterized by one or more shapes and configurations, including varying depths, offsets, or other features. In one or more embodiments, the air cavity can be disposed spatially under a module, within a module, or under and within one or more modules. Further details of various configurations are illustrated by way of the Figures, which will be described in more detail below.

Figure 12:
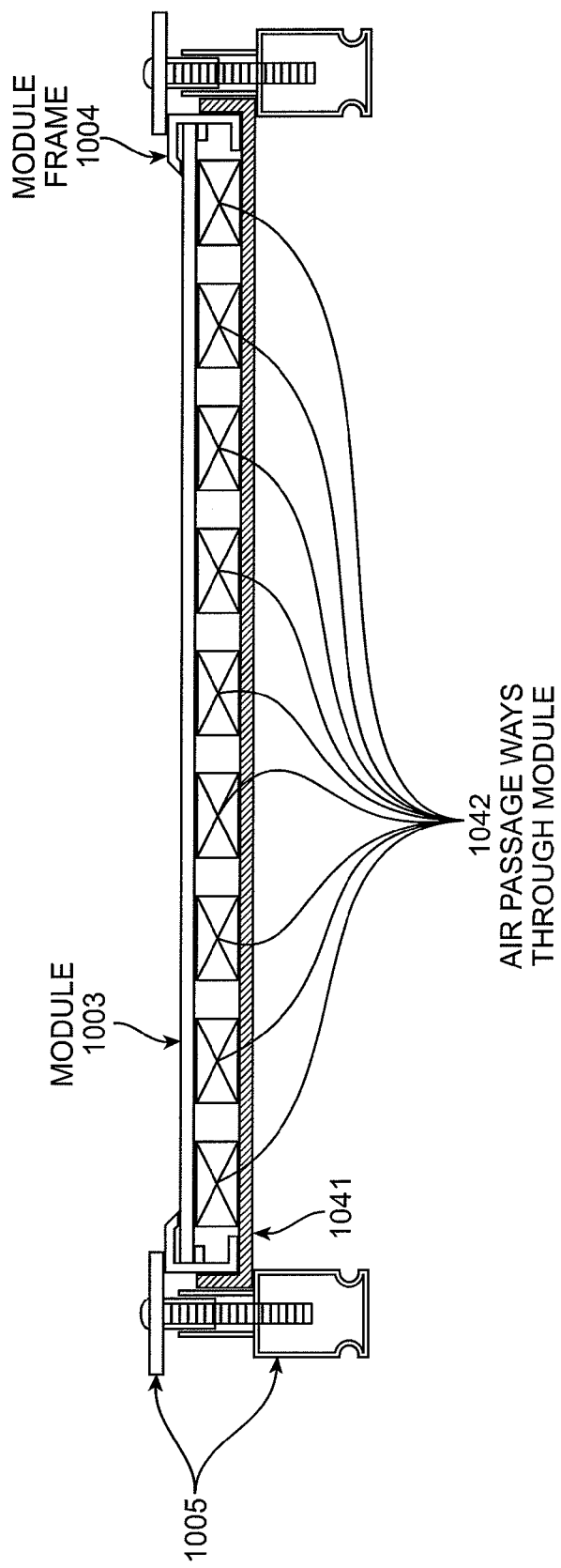
Figure 13:
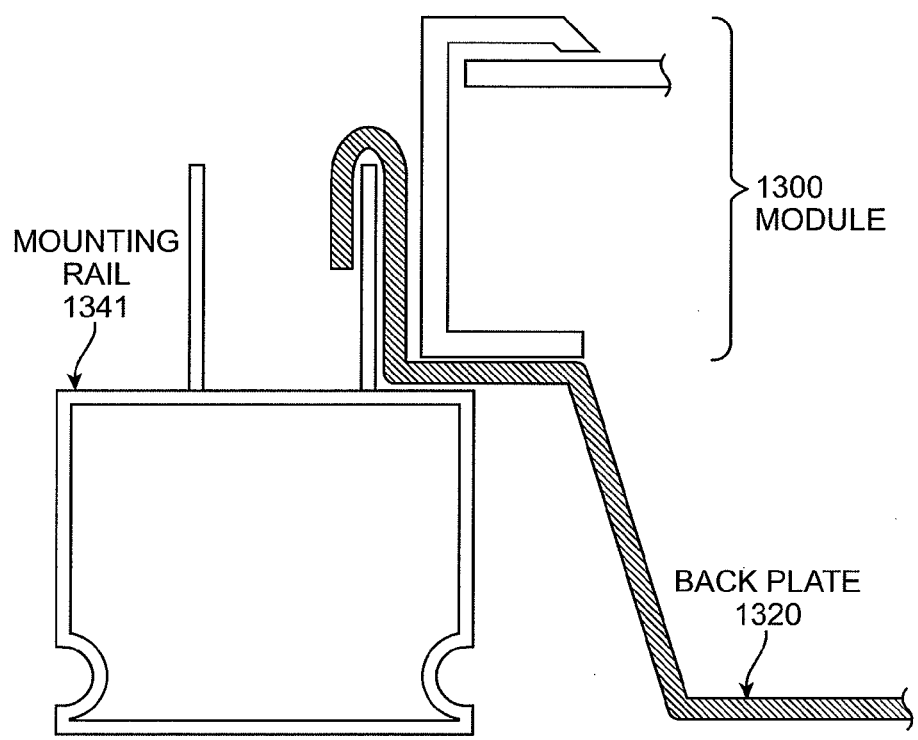
FIGS. 13 through 16 are simplified detailed diagrams of edge regions of the integrated pan, rack, and solar module according to embodiments of the present invention.
Figure 14:
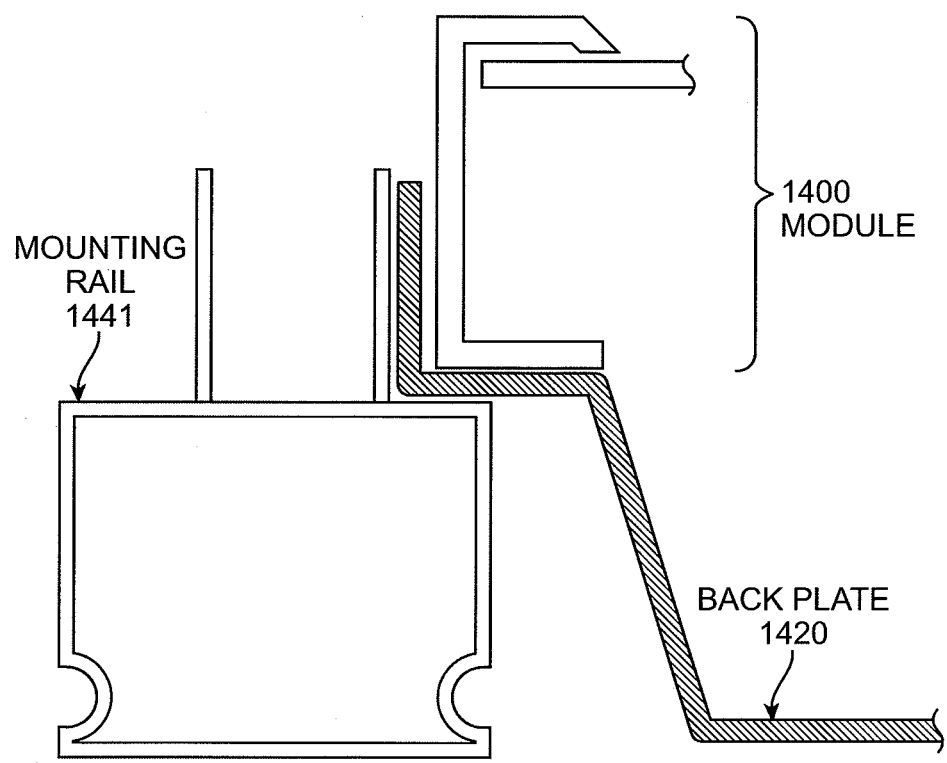
Figure 15:
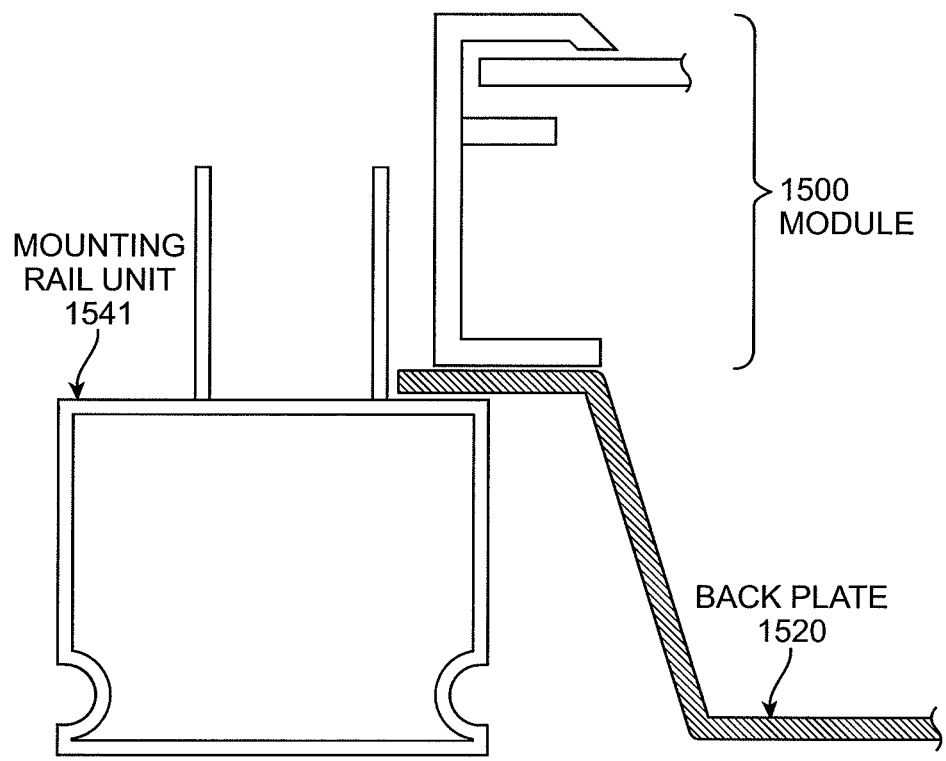
Figure 16:
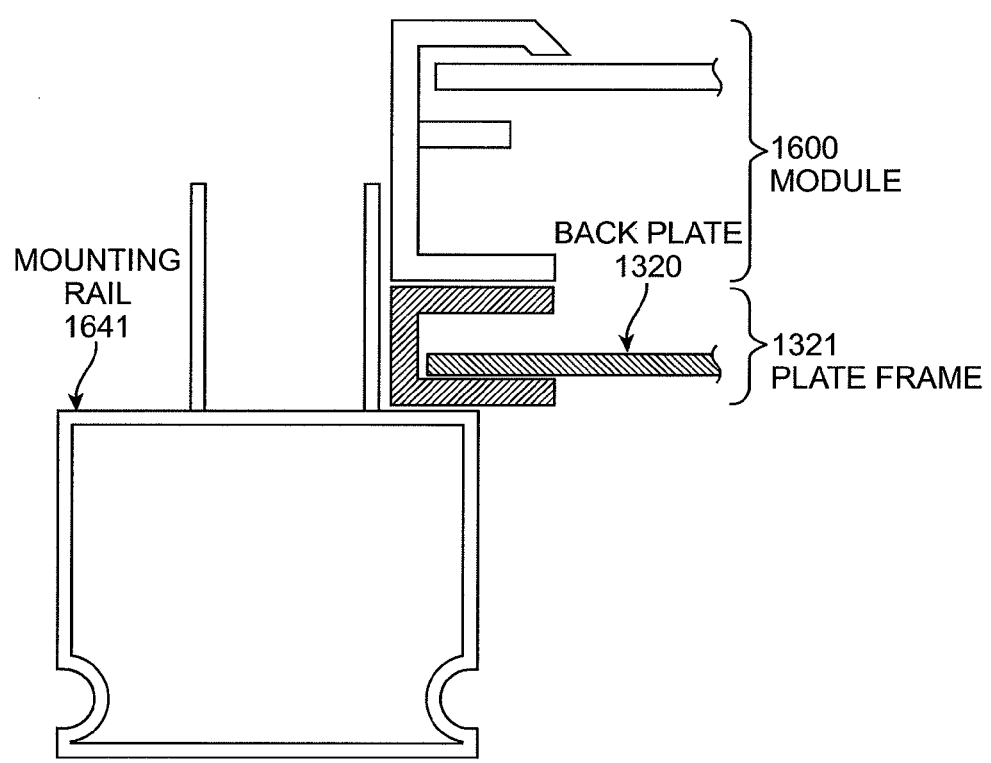

In a specific embodiment, the system provides an under solar component or module pan structure, as illustrated by reference numbers 1011, 1021, 1031 and 1041. In a specific embodiment, one or more air cavities are illustrated by way of reference numbers 1012, 1022, 1032, and 1042. As shown, the system includes solar component 1003, module frame integrated with the solar component 1004, mounting rack, strut or member 1005, among other features. In a specific embodiment referencing FIGS. 9, 10, and 11, the air cavity or air plenum as spatially located under the module pan structure 1011, 1021, 1031. Referring now to FIG. 12, the air cavity 1042 is spatially disposed as passing through the module or as integrated into the module or other solar module component. Of course, there can be other variations, modifications, and alternatives.

In a specific embodiment, the present system provides for passage of fluid flow such as air or other working medium. In a specific embodiment, the present system provides for a cavity or space, which defines an air plenum. The cavity or space allows for the passage, confinement, and control of a working fluid such as air, water, liquid or others according to a specific embodiment. The fluid flow occurs under or within a solar component, module or array. Depending upon the embodiment, the fluid flow is either passive in nature or active by way of mechanical mechanisms or devices. In a specific embodiment, the fluid flow (e.g., air or otherwise) may be used for various thermal transfer purposes. As an example, the thermal transfer purposes include, but are not limited to:

1. Thermal heat transfer from the photovoltaic component, or modules. In a specific embodiment, heat transfer can be utilized to draw away heat from the photovoltaic component thereby cooling and/or reducing the temperature of the component and limit a high elevated temperature associated with solar gain of the component or module. In a specific embodiment, one or more benefits would be achievable by reducing, limiting, or lowering the temperature of the photovoltaic component, as described below.

i) Improved photovoltaic efficiencies and power generation;

ii) Thermal expansion associated with elevation in temperature of the photovoltaic component and internal structure is reduced or minimized (which leads to lower internal stresses of the photovoltaic material to improve the photonics life and longevity, among other factures.

2. Thermal heat transfer to the fluid (air or otherwise). In a specific embodiment, thermal gain to the fluid occurs passively or actively. Furthermore, thermal gain can be transported, stored or converted to provide heat energy and power to the photovoltaic structure, other components, and systems.

3. Thermal heat transfer to the photovoltaic component or modules limit thermal contraction of the photovoltaic structure during exposure to cold or extreme temperature conditions. In a specific embodiment, thermal conduction is reduced, which leads to lower or reduced associated internal stresses in the photovoltaic material to improve life and longevity of the photovoltaic component or module. Of course, there can be other variations, modifications, and alternatives.

In a specific embodiment, the present system and method also includes one or more intermediary surfaces, which can constrain air flow. In a specific embodiment, ventilating one or more spatial area(s) over an upper region or top of the pan structure removes heat build up at the pan structure. That is, the ventilation leads to a reduction of heat transfer through the pan structure to its underside according to one or more embodiments. In a specific embodiment, any reduction of heat transfers can insulate and/or protect regions underlying the pan structure from thermal gain.

In other specific embodiments, the present invention can also provide one or more of the following features: weather water/weather protection; fire rated assembly involving intermediate ferrous or non-ferrous material; Template for achieving rail spacing; Strengthening or stiffening the solar array system through mechanical coupling with the pan structure; thermal platform onto which the photovoltaic absorber material are manufactured; and others. Of course, there can be other variations, modifications, and alternatives.

FIGS. 13 through 16 are simplified detailed diagrams of edge regions of the integrated pan, rack, and solar module according to embodiments of the present invention. These diagrams are merely examples, which should not unduly limit the scope of the claims herein. One of ordinary skill in the art would recognize other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A thermal solar system having a fire rating of at least A, the system comprising:
 a thermal solar module having an aperture region for receiving direct sunlight and a backside region, and being substantially solid therebetween;
 a shaped thickness of material having a first side and a second side, the shaped thickness of material being characterized by a fire rating of at least A, the material having a characteristic including a thickness to be free from penetration of moisture, the thickness having a structural characteristic capable of maintaining a shape coupled to the backside region of the thermal solar module;
 an air plenum defined at least in part by the backside region of the thermal solar module and the shaped thickness of material and surrounded by two sidewalls, a frontend wall, and a backend wall, the air plenum comprising an opening in a length of the frontend wall operable to draw airflow from ambient air as a working fluid therein;
 rail structures mounted on an underlying body;
 a frame assembly operably integrating the two sidewalls, the frontend wall, and the backend wall, the frame assembly retaining the shaped thickness of material with the rail structures from edge segments such that the shaped thickness of material is spaced from the thermal solar module, and such that the shaped thickness of material and the thermal solar module are supported over the underlying body; and
 a duct assembly coupled to the air plenum for guiding the working fluid from the air plenum to an interior fluid flow region beneath the underlying body.

2. The system of claim 1 wherein the fire rating of at least A is a UL rating to substantially shield against propagation of fire to one or more portions of a building-structure associated with the underlying body.

3. The system of claim 1 wherein the shaped thickness of material is substantially water tight.

4. The system of claim 1 wherein the thermal solar module, shaped thickness of material, air plenum, and frame assembly are assembled to provide a roofing system.

5. The system of claim 4 wherein the roofing system is configured to be installed over the underlying body free from a water shielding or water proofing material underlayment.

6. The system of claim 1 further comprising an insulating cavity isolated between the shaped thickness of material and the underlying body, the insulating cavity being configured to insulate the underlying body.

7. The system of claim 1 wherein the shaped thickness of material is made of a material selected from at least a metal, a thermally formed polymer, a fiberglass, or a synthetic.

8. The system of claim 1 wherein the shaped thickness of material having a width, the width being indicative of a rail spacing, the rail spacing being associated with the frame assembly.

9. The system of claim 1 wherein the shaped thickness of material comprises a plurality of regions numbered from 1 through N, where N is an integer greater than 2, each of the regions being coupled to another region in a sequential arrangement, each of the regions being separable from each other.

10. The system of claim 9 wherein a first region and a second region are coupled to each other using an S seam structure to integrally lock the first region to the second region, the first region and the second region being from the plurality of regions.

11. A method of installing a solar module, the method comprising:
 mounting rail structures and a frame assembly to a building structure, the frame assembly retaining one or more pan structures with the rail structures along edge segments, the frame assembly having an opening in a length;
 coupling one or more solar modules comprising an aperture region for receiving direct sunlight and a backside region, and being substantially solid therebetween, within the frame assembly such that the one or more solar modules are spaced from the one or more pan structures, and the backside region and the one or more pan structures define at least in part a plenum region for drawing airflow from ambient air through the opening in the length; and
 disposing a duct assembly through the one or more pan structures to guide the airflow from the plenum region to a fluid flow region associated with the building structure.

12. The method of claim 11 wherein the pan structure comprises a plurality of pan segments, each of the pan segments coupled in series to form a continuous region for the plenum region.

13. The method of claim 12 wherein a first pan segment is mechanically coupled to a second pan segment using an "S" seam device, the first pan segment and the second pan segment being from the plurality of pan segments.

14. A thermal solar system having a fire resistant characteristic, the system comprising:
 a thermal solar module having an aperture region for receiving direct sunlight and a backside region, and being substantially solid therebetween;
 a shaped thickness of material having a first side and a second side, the shaped thickness of material being characterized by a fire resistant characteristic including a thickness to be free from penetration of moisture, the thickness of material having a structural characteristic capable of maintaining a shape and coupling to the backside region of the thermal solar module;
 an air plenum defined at least in part by the thermal solar module and the shaped thickness of material, the air plenum having an opening in a sidewall partially defining the air plenum to draw airflow from ambient air;
 a building structure having an inner region having a first pressure;
 rail structures mounted to the building structure;
 a frame assembly mounted to the building structure and retaining the shaped thickness of material with the rail structures from edge segments such that the shaped thickness of material is spaced from the thermal solar module, and such that the shaped thickness of material and the thermal solar module are supported over the building structure; and
 a duct assembly connecting the air plenum through a fluid flow region to the inner region, the fluid flow region being configured to control a second pressure characterizing the air plenum so that the second pressure can be varied from the first pressure by causing a dynamic pressure of the airflow directed through the air plenum.

15. The system of claim 14 wherein the second pressure is controlled to be less than the first pressure and maintains the inner region of the building structure substantially free from water driven from the dynamic pressure during rain fall or wind.

16. The system of claim 14 wherein the second pressure is controlled to be greater than the first pressure to direct air heated by the thermal solar module from the air plenum into the fluid flow region for capturing thermal energy.

17. A thermal solar system having a fire resistant characteristic, the system comprising:
- a solar module having an aperture region for receiving direct sunlight and a backside region, and being substantially solid therebetween;
- a shaped thickness of material having a first side and a second side, the shaped thickness of material being characterized by a fire resistant characteristic including a thickness to be free from penetration of moisture, the thickness having a structural characteristic capable of maintaining a shape and coupling to the backside region of the solar module;
- a first air plenum defined at least in part by the backside region of the solar module and the shaped thickness of material;
- a second air plenum provided between the shaped thickness of material and a building structure;
- rail structures mounted on the building structure;
- a frame assembly retaining the shaped thickness of material with the rail structures from edge segments such that the shaped thickness of material is spaced from the solar module, and such that the shaped thickness of material and the solar module are supported over the building structure; and
- a duct assembly connecting the first air plenum through the shaped thickness of material to an inner region of the building structure for directing airflow, the airflow being isolated from the second air plenum.

18. The system of claim 17 wherein the first air plenum is decoupled from the second air plenum.

19. The system of claim 18 wherein the second air plenum forms an insulating region between the building structure and the solar module.

20. The system of claim 1 wherein the shaped thickness of material is configured to have the first side and the second side respectively coupled to the frame assembly supporting the thermal solar module, the frame assembly being coupled to the underlying body.

21. The system of claim 1 wherein the duct assembly comprises an air-take-off duct through an opening in the shaped thickness of material and comprises a water flashing assembly over the opening for preventing water droplets into the air-take-off duct.

22. The system of claim 1 wherein the interior fluid flow region comprises a heat exchanger to control temperature of the working fluid, an air moving device to control a dynamic pressure and flow direction of the working fluid, and one or more dampers to control mass flow output.

23. The system of claim 22 wherein the dynamic pressure maintains substantially water free in the interior fluid flow region of the underlying body during raining days and alternatively delivers heated air carrying thermal energy from the thermal solar module during sunny days.

24. The method of claim 11 wherein the fluid flow region is configured to cause a dynamic pressure of the fluid flow directed through the plenum region in either direction depending on raining or sunny weather condition.

25. The method of claim 12 wherein the duct assembly comprises one or more ducts respectively connected from below to one or more openings in a last pan segment belonging to the plurality of pan segments.

26. The system of claim 14 wherein the fluid flow region comprises an air moving device to drive the fluid flow through the air plenum, the air moving device being controlled by a controller coupled with one or more sensor devices.

27. The system of claim 14 wherein the fluid flow region comprises a heat exchanger to transfer thermal energy carried by the fluid flow for heating application.

28. The system of claim 14 wherein the building structure is further separated from the shaped thickness of material by a cavity, the cavity being isolated from the air plenum and holding stagnant dead air to provide insulation and prevent fire propagation.

29. The system of claim 17 wherein the duct assembly comprises an air take-off duct through the opening in the shaped thickness of material for connecting the first air plenum through a roof underlayment of the building structure into a fluid flow region coupled to the inner region of the building structure.

30. The system of claim 29 wherein the fluid flow region comprises an air moving device for directing the air flow through the first air plenum in either direction for bringing fresh air into the inner region of the building structure or exhausting air out of the inner region to keep the building structure dry and cool.

31. The system of claim 30 wherein the fluid flow region further comprises a heat exchanger for capturing thermal energy carried by the fresh air directed from the first air plenum.

* * * * *